(12) United States Patent
Song et al.

(10) Patent No.: US 11,478,937 B2
(45) Date of Patent: Oct. 25, 2022

(54) CARE ROBOT CONTROLLER

(71) Applicant: SOUTHEAST UNIVERSITY, Jiangsu (CN)

(72) Inventors: Aiguo Song, Nanjing (CN); Chaolong Qin, Nanjing (CN); Jiahang Zhu, Nanjing (CN); Linhu Wei, Nanjing (CN); Yu Zhao, Nanjing (CN); Huijun Li, Nanjing (CN); Baoguo Xu, Nanjing (CN)

(73) Assignee: SOUTHEAST UNIVERSITY, Jiangsu (CN)

(*) Notice: Subject to any disclaimer, the term of this patent is extended or adjusted under 35 U.S.C. 154(b) by 42 days.

(21) Appl. No.: 17/280,305

(22) PCT Filed: Apr. 21, 2020

(86) PCT No.: PCT/CN2020/085881
§ 371 (c)(1),
(2) Date: Mar. 26, 2021

(87) PCT Pub. No.: WO2021/169008
PCT Pub. Date: Sep. 2, 2021

(65) Prior Publication Data
US 2022/0111536 A1    Apr. 14, 2022

(30) Foreign Application Priority Data
Feb. 24, 2020 (CN) .......................... 202010113344.9

(51) Int. Cl.
*G06F 3/033* (2013.01)
*B25J 13/02* (2006.01)
(Continued)

(52) U.S. Cl.
CPC ............ *B25J 13/025* (2013.01); *G06F 3/016* (2013.01); *G06F 3/033* (2013.01); *G06F 3/0338* (2013.01)

(58) Field of Classification Search
None
See application file for complete search history.

(56) References Cited

U.S. PATENT DOCUMENTS

| 4,795,296 A | 1/1989 | Jau |
| 2008/0271933 A1 | 11/2008 | Morimoto et al. |

(Continued)

FOREIGN PATENT DOCUMENTS

| CN | 101258389 A | 9/2008 |
| CN | 107003750 A | 8/2017 |

(Continued)

*Primary Examiner* — Xuyang Xia
(74) *Attorney, Agent, or Firm* — ArentFox Schiff LLP; Michael Fainberg

(57) ABSTRACT

The present invention discloses a care robot controller, which includes: a controller body that includes slide rails, finger slot sliders and a joystick, wherein the finger slot sliders are movably arranged on the slide rails and configured to receive pressing, and the joystick is configured to control the care robot; a gesture parsing unit configured to parse three-dimensional gestures of the controller body, and control the care robot to perform corresponding actions when the three-dimensional gestures of the controller body are in line with preset gestures; and a tactile sensing unit configured to sense the pressing received by the finger slot sliders and initiate a user mode corresponding to the pressing information, so that the controller body provides corresponding vibration feedback. Thus the user can control the controller efficiently and conveniently, the control accuracy is improved, and effective man-machine interaction is realized.

5 Claims, 3 Drawing Sheets

(51) Int. Cl.
*G06F 3/01* (2006.01)
*G06F 3/0338* (2013.01)

(56) References Cited

U.S. PATENT DOCUMENTS

| | | | |
|---|---|---|---|
| 2011/0037695 A1* | 2/2011 | Bor | G06F 3/033 |
| | | | 345/158 |
| 2016/0062489 A1 | 3/2016 | Li | |
| 2017/0123516 A1* | 5/2017 | Li | G08C 23/04 |
| 2017/0255301 A1 | 9/2017 | Norton et al. | |
| 2019/0001508 A1 | 1/2019 | Li et al. | |
| 2020/0019263 A1* | 1/2020 | Korherr | B60R 11/0235 |

FOREIGN PATENT DOCUMENTS

| | | | |
|---|---|---|---|
| CN | 109202942 A | 1/2019 | |
| CN | 109927056 A | 6/2019 | |
| EP | 2299344 A | 3/2011 | |
| WO | WO-0201589 A1 * | 1/2002 | A63F 13/06 |

* cited by examiner

CARE ROBOT CONTROLLER

CROSS-REFERENCE TO RELATED APPLICATIONS

This application is the U.S. National Stage Application of International Patent Application No. PCT/CN2020/085881, filed on Apr. 21, 2020, which claims priority to Chinese Patent Application No. 202010113344.9, filed on Feb. 24, 2020, the contents of each of which is incorporated herein by reference in its entirety.

TECHNICAL FIELD

The present invention relates to the field of mechanical control, in particular to a care robot controller.

BACKGROUND ART

In recent years, the aging of population in China has become deepened increasingly, and the need of bedridden elders for nursing and care has been increasing continuously; in addition, the quantity of patients with limb injuries caused by traffic accidents has also been increasing rapidly. The society and families have to treat and care those patients at huge cost and bear a heavy burden. In order to meet the basic living needs of the bedridden elders and patients and improve their quality of life, intelligent care robots have become the current hotspot in researches.

However, care robots may cause harm to the users and their environments because the care robots work in a complex working environment, there is uncertainty in the objects and mode of operation, the interaction between the robots and human and between robots and the environment is complex or even dangerous; with the development of the technology, a simple and single interaction approach can't meet the requirements of the users anymore.

In the prior art, independent intelligent algorithms for autonomous navigation, object recognition and object picking of care robots are not matured enough, and it is difficult to realize natural, safe and effective communication between the robots and human or between the robots and the environment, and difficult to meet diversified and complex care requirements in local areas in an unknown and varying home environment, such as searching for unrecognized articles in detail and picking those articles, etc.

SUMMARY

Object of the Invention: the object of the present invention is to provide a care robot controller.

Technical Solution: in the embodiments of the present invention, the present invention provides a care robot controller, which includes: a controller body, a gesture parsing unit and a tactile sensing unit, wherein:

the controller body is connected with the care robot, the gesture parsing unit, and the tactile sensing unit respectively, and includes slide rails, finger slot sliders, and a joystick, wherein the finger slot sliders are movably arranged on the slide rails and configured to receive pressing, and the joystick is configured to control the care robot;

the gesture parsing unit is configured to parse three-dimensional gestures of the controller body, and control the care robot to perform corresponding actions when the three-dimensional gestures of the controller body are in line with preset gestures;

and the tactile sensing unit is configured to sense the pressing received by the finger slot sliders and initiate a user mode corresponding to the pressing information, so that the controller body provides corresponding vibration feedback.

Specifically, the controller body includes filling sliders and four slide rails arranged around the controller body, wherein each slide rail corresponds to a finger slot slider and at least one filling slider, and the finger slot slider and the filling slider form a circular ring and are movably arranged on the slide rail.

Specifically, the controller body further includes a first button and a second button, and the tactile sensing unit activates the controller body and controls the first button and the second button to provide vibration feedback when the first button and the second button receive pressing at the same time.

Specifically, the tactile sensing unit is configured to control the four finger slot sliders on the four slide rails to provide vibration feedback after the controller body is activated, and then sense the pressing received by the finger slot sliders, and, if the pressing mode corresponds to a stored user mode, initiate a corresponding user mode and invoke a corresponding sensing feedback model to sense the pressure and control the vibration feedback; if the pressing mode doesn't correspond to any stored user mode, record the pressing mode and create a new corresponding user mode, control the finger slot sliders to provide vibration feedback, record the pressure values sensed by the finger slot sliders and the current corresponding vibration feedback intensity, and thereby train an initial sensing feedback model.

Specifically, the tactile sensing unit is preset with pressing rules corresponding to operating modes, and, if an operating mode corresponding to the sensed pressing rule exists after the first button receives pressing in the user mode, triggers the controller to enter into the corresponding operating mode.

Specifically, the operating mode includes a care robot movement control mode, in which the joystick is activated after it is swung in the circumferential direction, the controller body is activated after it is turned in the circumferential direction, and the gesture parsing unit parses an inclination angle $\theta$ of the controller body, and, if the inclination angle $\theta$ meets a criterion "preset threshold $\alpha < \theta <$ preset threshold $\beta$", calculates the movement direction and speed corresponding to the inclination angle $\theta$, and thereby controls the movement of the care robot.

Specifically, the operating mode includes a care robot arm control mode, in which the joystick is activated after it is swung in the circumferential direction, the controller body is activated after it is turned in the circumferential direction, and the gesture parsing unit parses an inclination angle $\theta$ of the controller body, and if the inclination angle $\theta$ meets a criterion "preset threshold $\alpha < \theta <$ preset threshold $\beta$", controls the ends of the care robot arms to move up or down according to the inclination angle $\theta$ if the orientation of the controller body is within the range of a preset first sector; or controls the ends of the care robot arms to rotate in a forward or backward direction in a horizontal plane according to the inclination angle $\theta$ if the orientation of the controller body is within the range of a preset second sector.

Specifically, the operating mode includes a care robot jaw control mode, the controller enters into the care robot jaw control mode when the second button is pressed in the care robot arm control mode of the controller, and in the care robot jaw control mode, the gesture parsing unit parses an inclination angle $\theta$ of the controller body, and if the inclination angle $\theta$ meets a criterion "preset threshold α<θ<preset threshold β", controls the jaws of the care robot arms to grip or release according to the inclination angle θ if the orientation of the controller body is within the range of a preset first sector; or controls the ends of the care robot arms to rotate in a forward or backward direction in a vertical plane according to the inclination angle θ if the orientation of the controller body is within the range of a preset second sector.

Specifically, the first button and the second button provide vibration feedback after they receive a pressing command, and the tactile sensing unit invokes the sensing feedback model to control the finger slot sliders to provide vibration feedback after the finger slot slider receive pressing as a command input.

Specifically, the sensing feedback model is configured to learn the ranges of pressure on the finger slot sliders and combinations of the pressure values in a specific user mode, and adjust the pressing thresholds for the vibration feedback of the finger slot sliders according to the ranges of pressure and the combinations of pressure values.

Benefits: compared with the prior art, the present invention has the following prominent advantages: the finger slot sliders can be used to adjust the position; different user modes and specific vibration feedback are provided for different users; corresponding actions of the care robot can be determined according to the three-dimensional gestures of the controller, while unsmooth and inefficient man-machine interaction caused by the differences in habit between different users can be avoided. Thus the user can control the controller efficiently and conveniently, the control accuracy can be improved, and natural and effective man-machine interaction can be realized;

Furthermore, a multi-channel fused signal recognition mode utilizing different fingers is employed, the parameters of the sensing feedback model are learned and improved continuously, and the change in the use pattern of the user over time and the obstacles in man-machine interaction resulted from the interference of tactile sensing coupling among different fingers can be avoided.

1—first button; 2—second button; 3—index finger slot slider; 4—middle finger slot slider; 5—ring finger slot slider; 6—little finger slot slider; 7—joystick; 8—controller body; 9 to 12—filling sliders.

DETAILED DESCRIPTION OF THE EMBODIMENTS

Hereunder the technical solution of the present invention will be further detailed with reference to the accompanying drawings.

Figure 1:
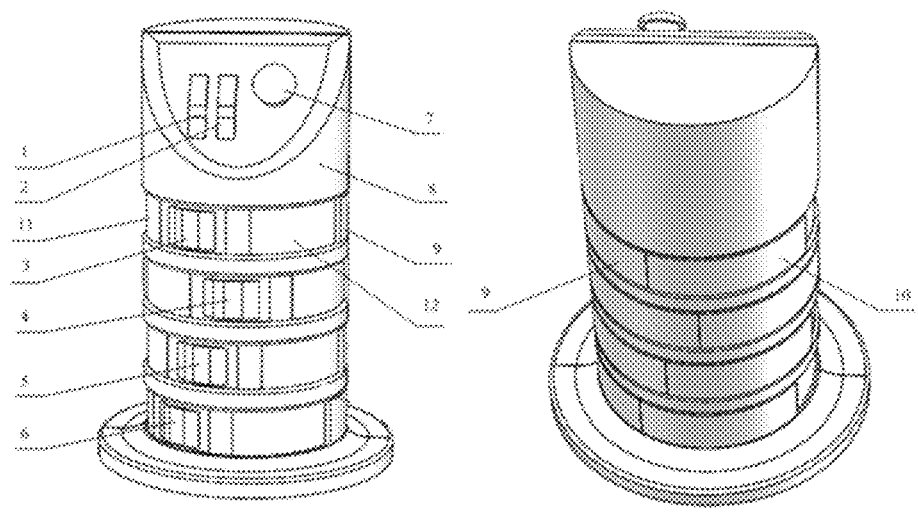
FIG. 1 is a schematic structural diagram of the care robot controller provided in an embodiment of the present invention.

Please see FIG. 1, a schematic structural diagram of the care robot controller provided in an embodiment of the present invention, including the specific structure of the care robot controller. Hereunder the structure of the care robot controller will be detailed with reference to the accompanying drawings.

In the embodiments of the present invention, the present invention provides a care robot controller, which includes: a controller body 8, a gesture parsing unit and a tactile sensing unit, wherein:

the controller body 8 is connected with the care robot, the gesture parsing unit, and the tactile sensing unit respectively, and includes slide rails, finger slot sliders 3 to 6, and a joystick 7, wherein the finger slot sliders 3 to 6 are movably arranged on the slide rails and configured to receive pressing, and the joystick 7 is configured to control the care robot;

the gesture parsing unit is configured to parse three-dimensional gestures of the controller body 8, and control the care robot to perform corresponding actions when the three-dimensional gestures of the controller body 8 are in line with preset gestures;

and the tactile sensing unit is configured to sense the pressing received by the finger slot sliders 3 to 6 and initiate a user mode corresponding to the pressing information, so that the controller body 8 provides corresponding vibration feedback.

In actual implementation, the controller is configured to control the care robot, wherein the controller body 8 may usually be a handle mechanism. The slide rails are arranged on the controller body 8, and usually are concave channels. The finger slot sliders 3 to 6 are movably arranged on the slide rails and can move along the slide rails, so as to adapt to the positions of force application by the finger tips as far as possible when different users hold the controller body 8, and improve the perception of the fingers on force touch and enhance the control of the controller by bedridden users.

In actual implementation, the joystick 7 may be configured to control the care robot, and can control the movement of the care robot itself or control the operation of the mechanical arms of the care robot in different modes or situations.

In actual implementation, the gesture parsing unit can judge whether the control exercised by the user on the controller body 8 is effective or not according to whether the gestures of the actions (e.g., gestures of movement and gesture of swing, etc.) of the controller body 8 in the three-dimensional space meet the preset gestures of the actions, and can control the care robot to make corresponding actions and thereby avoid incorrect operations when the control exercised by the user is effective. Usually the gesture parsing unit controls the care robot roughly, while the joystick 7 controls the care robot accurately. Through combining the rough control with the accurate control, the user's requirement for the speed and accuracy of control on the care robot can be met, so that the user can control the controller efficiently and conveniently, the control accuracy can be improved, and effective man-machine interaction can be implemented.

In actual implementation, the pressing information is usually embodied in the user's pressing force, pace, sequence, combination of the pressing actions, and the time interval, etc. on the finger slot sliders 3 to 6. After the user uses the controller, the controller records the user's habit of use and creates a corresponding user mode, which has a relation of correspondence with specific pressing information. The corresponding user mode will be initiated once the tactile sensing unit senses specific pressing information. If one is a new user who hasn't used the controller before and the recorded specific pressing information can't be inputted, it is unable to initiate a stored user mode. In that case, the controller has to learn and record new pressing information and obtain the use habit of a new user and thereby create a corresponding new user mode, which has a relationship of correspondence with the new pressing information, so that the new user mode can be initiated for the new user later. Therefore, different user modes correspond to different users, thus the effectiveness of man-machine interaction is improved for each user.

In actual implementation, whenever the user mode is initiated, the controller body 8 provides vibration feedback. Specifically, the vibration feedback may be provided by means of the entire controller body 8 or by means of the finger slot sliders 3 to 6. The user can judge whether the input is effective or not on the basis of the vibration feedback. Thus, the effectiveness of man-machine interaction is further improved.

Figure 2:
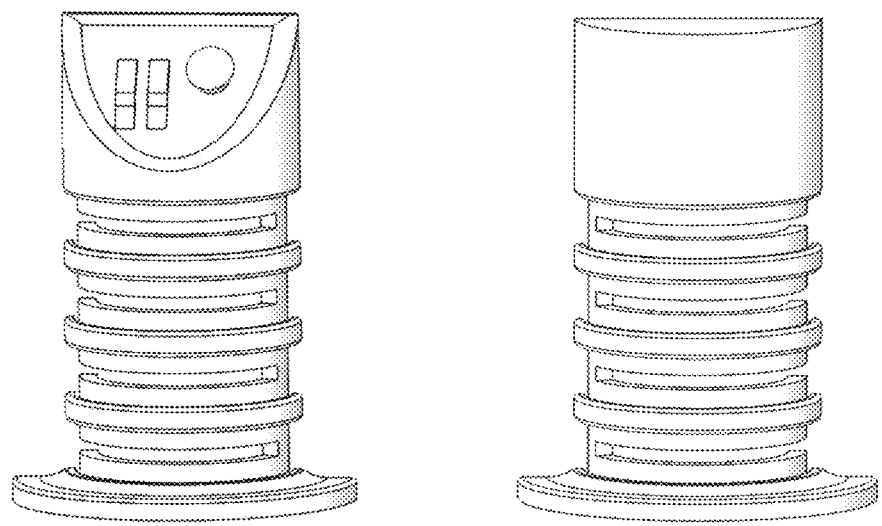
FIG. 2 is a schematic structural diagram of the controller body provided in an embodiment of the present invention.
Figure 3:
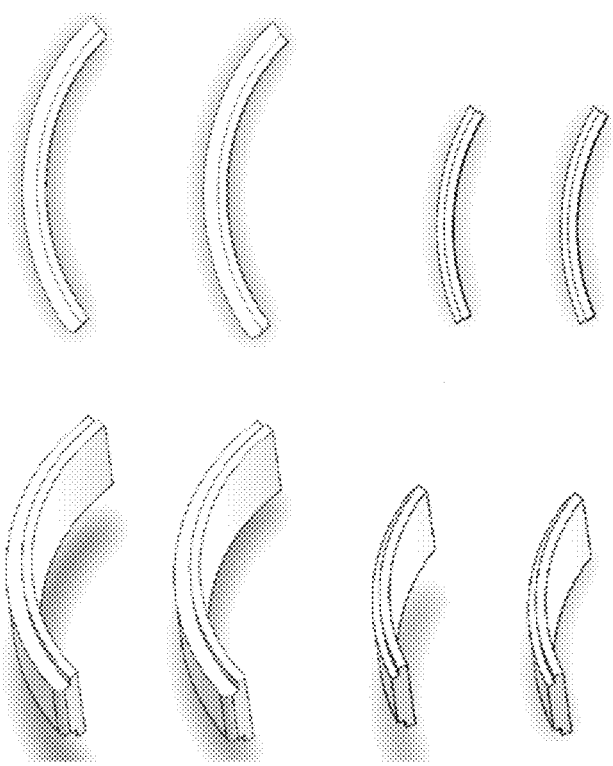
FIG. 3 is a schematic structural diagram of the filling slider provided in an embodiment of the present invention.
Figure 4:
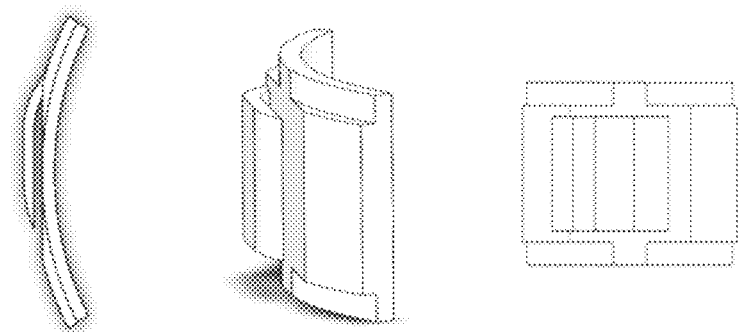
FIG. 4 is a schematic structural diagram of the finger slot slider provided in an embodiment of the present invention.

Please refer to FIGS. 2, 3, and 4. FIG. 2 is a schematic structural diagram of the controller body 8 provided in an embodiment of the present invention; FIG. 3 is a schematic structural diagram of four filling sliders 9 to 12 arranged around the controller body in an embodiment of the present invention; and FIG. 4 is a schematic structural diagram of the finger slot sliders 3 to 6 provided in an embodiment of the present invention.

In this embodiment of the present invention, the controller body 8 includes filling sliders 9 to 12 and four slide rails arranged around the controller body 8, wherein each slide rail corresponds to a finger slot slider (one of finger slot sliders 3 to 6) and at least one filling slider, and the finger slot slider and the filling slider form a circular ring and are movably arranged on the slide rail.

In actual implementation, the four slide rails arranged around the controller body 8 and the finger slot sliders 3 to 6 arranged on the slide rails may correspond to four fingers of the user, i.e., an index finger slot slider 3, a middle finger slot slider 4, a ring finger slot slider 5, and a little finger slot slider 6. Thus, the controller can adapt to the force application positions of the finger tips when different users hold the controller body 8.

In actual implementation, the controller body 8 (shown in FIG. 2) may be composed of two semi-cylinders (or cylinders in other shapes). Thus, by arranging the filling sliders 9 to 12 on the slide rails and utilizing the cooperation between the filling sliders 9 to 12 and the finger slot sliders 3 to 6 or the slide rails, on the premise of easy installation and removal of the controller body 8, not only finger slots can be formed on the two sides of the finger slot sliders 3 to 6 to guide the user's fingers to grip in the finger slots, but also a slidable circular ring structure can be formed to facilitate the position adjustment of the finger slot sliders 3 to 6.

In this embodiment of the present invention, the controller body 8 further includes a first button 1 and a second button 2, and the tactile sensing unit activates the controller body 8 and controls the first button 1 and the second button 2 to provide vibration feedback when the first button 1 and the second button 2 receive pressing at the same time.

In actual implementation, by pressing the first button 1 and the second button 2 at the same time, the controller body 8 can be activated to operate, and the first button 1 and the second button 2 provide vibration feedback to indicate that the command is inputted successfully to the user.

In this embodiment of the present invention, the tactile sensing unit is configured to control the four finger slot sliders 3 to 6 on the four slide rails to provide vibration feedback after the controller body 8 is activated, and then sense the pressing received by the finger slot sliders 3 to 6, and, if the pressing mode corresponds to a stored user mode, initiate a corresponding user mode and invoke a corresponding sensing feedback model to sense the pressure and control the vibration feedback; if the pressing mode doesn't correspond to any stored user mode, record the pressing mode and create a new corresponding user mode, control the finger slot sliders 3 to 6 to provide vibration feedback, record the pressure values sensed by the finger slot sliders 3 to 6 and the current corresponding vibration feedback intensity, and thereby train an initial sensing feedback model.

In this embodiment of the present invention, the tactile sensing unit is preset with pressing rules corresponding to operating modes, and if an operating mode corresponding to the sensed pressing rule exists after the first button 1 receives pressing in the user mode, triggers the controller to enter into the corresponding operating mode.

In actual implementation, diversified operating modes are provided to enable fine control on the care robot. The pressing rules may be predefined by the user. For example, the care robot may be set to a movement control mode by pressing the corresponding finger slot slider 3 twice successively with the index finger after the first button 1 is pressed and a button vibration feedback is obtained; or the care robot may be set to a mechanical arm control mode by pressing the corresponding finger slot slider 4 twice successively with the middle finger.

Figure 5:
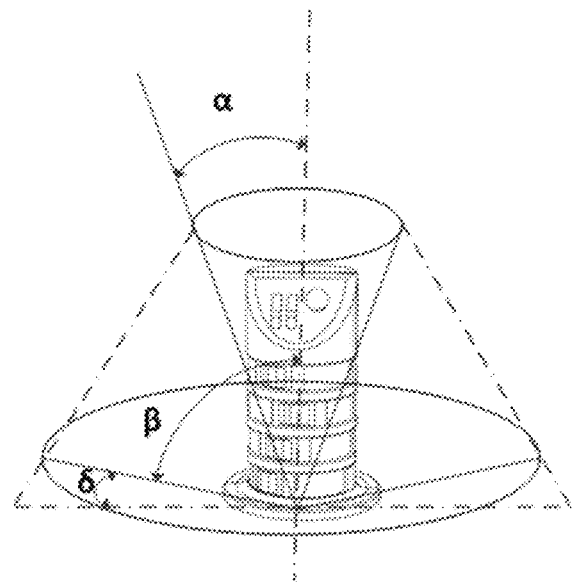
FIG. 5 is a spatial schematic diagram of the effective function of the gesture parsing unit provided in an embodiment of the present invention.

Please refer to FIG. 5, which is a spatial schematic diagram of the effective function of the gesture parsing unit provided in an embodiment of the present invention.

In this embodiment of the present invention, the operating mode includes a care robot movement control mode, in which the joystick 7 is activated after it is swung in the circumferential direction, the controller body 8 is activated after it is turned in the circumferential direction, and the gesture parsing unit parses an inclination angle $\theta$ of the controller body 8, and if the inclination angle $\theta$ meets a criterion "preset threshold $\alpha<\theta<$preset threshold $\beta$", calculates the movement direction and speed corresponding to the inclination angle $\theta$, and thereby controls the movement of the care robot.

In actual implementation, the joystick 7 is activated after it is swung in the circumferential direction, and can be used to control the care robot to avoid the danger caused by incorrect operations.

In actual implementation, the preset threshold $\alpha$ and the preset threshold $\beta$ may be set by the user according to the actual application scenario; the inclination angle $\theta$ is the angle between the central axis of the inclined controller body 8 and the vertical direction, and the criterion "preset threshold $\alpha<\theta<$preset threshold $\beta$" means that the controller body 8 falls in the range of $\alpha$ and $\beta$ after the controller body 8 is inclined, wherein $\beta+\delta=90°$, and the inclination angle $\theta$ is effective in the interval $(\alpha, \beta)$. By setting the range of effective control, the effectiveness of man-machine interaction can be improved and the danger caused by incorrect operations can be avoided. Usually, wide-range movement can be controlled by means of the gesture actions of the controller body 8, while fine manipulation within an obstacle avoidance range or in a complex environment can be realized by means of the joystick 7.

Figure 6:
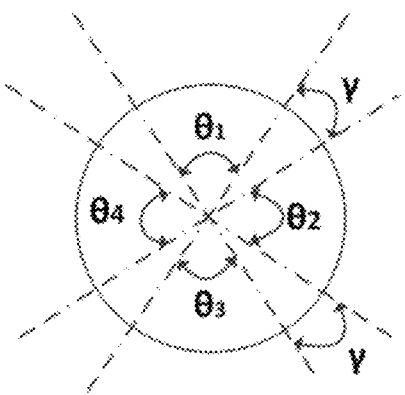
FIG. 6 is a schematic diagram of the projection of the effective functional area of the controller body in an embodiment of the present invention on the horizontal plane.

Please refer to FIG. 6, which is a schematic diagram of the projection of the effective functional area of the controller body 8 in an embodiment of the present invention on the horizontal plane.

In this embodiment of the present invention, the operating mode includes a care robot arm control mode, in which the joystick 7 is activated after it is swung in the circumferential direction, the controller body 8 is activated after it is turned in the circumferential direction, and the gesture parsing unit parses an inclination angle θ of the controller body 8, and if the inclination angle θ meets a criterion "preset threshold α<θ<preset threshold β", controls the ends of the care robot arms to move up or down according to the inclination angle θ if the orientation of the controller body 8 is within the range of a preset first sector; or controls the ends of the care robot arms to rotate in a forward or backward direction in a horizontal plane according to the inclination angle θ, if the orientation of the controller body 8 is within the range of a preset second sector.

In actual implementation, the user's operation on the gestures of the controller body 8 belongs to a valid input of command if it meets two criteria: (1) θ meets: preset threshold α<θ<preset threshold β; (2) the orientation of the controller body 8 is within the range of a preset first sector or the range of a second sector.

In actual implementation, the range of the first sector is within angle $\theta_1$ or $\theta_3$ and the range of the second sector is within angle $\theta_2$ or $\theta_4$, and the angular interval between every two of the angles is γ; the specific angles may be set by the user according to the actual application scenario. The controller body 8 may be oriented within the angular interval γ to avoid misoperation when the controller is not used.

In this embodiment of the present invention, the operating mode includes a care robot jaw control mode, the controller enters into the care robot jaw control mode when the second button 2 is pressed in the care robot arm control mode of the controller, and in the care robot jaw control mode, the gesture parsing unit parses an inclination angle θ of the controller body 8, and if the inclination angle θ meets a criterion "preset threshold α<θ<preset threshold β", controls the jaws of the care robot arms to grip or release according to the inclination angle θ if the orientation of the controller body 8 is within the range of a preset first sector; or controls the ends of the care robot arms to rotate in a forward or backward direction in a vertical plane according to the inclination angle θ if the orientation of the controller body 8 is within the range of a preset second sector.

In this embodiment of the present invention, the first button 1 and the second button 2 provide vibration feedback after they receive a pressing command, and the tactile sensing unit invokes the sensing feedback model to control the finger slot sliders 3 to 6 to provide vibration feedback after the finger slot slider 3 to 6 receive pressing as a command input.

In this embodiment of the present invention, the sensing feedback model is configured to learn the ranges of pressure on the finger slot sliders 3 to 6 and combinations of the pressure values in a specific user mode, and adjust the pressing thresholds for the vibration feedback of the finger slot sliders 3 to 6 according to the ranges of pressure and the combinations of pressure values.

In actual implementation, the sensing feedback model may be constructed on the basis of an algorithm, such as a neural network algorithm, for learning the user's use habit, which usually includes information such as the pressure values exerted by different fingers when the user inputs a command and the pressure values exerted subconsciously by the other fingers when a finger presses, so as to determine the pressure ranges and combinations of pressure values that belong to valid inputs of commands of the user and for which vibration feedback for surface pressing commands will be provided (the vibration feedback indicates that a pressing command has been inputted effectively). Thus the effectiveness of man-machine interaction is improved and the accuracy of control can be improved.

The invention claimed is:

1. A care robot controller of a care robot, comprising: a controller body, a gesture parsing unit and a tactile sensing unit, wherein:

the controller body is connected with the care robot, the gesture parsing unit, and the tactile sensing unit respectively, and comprises slide rails, finger slot sliders, and a joystick, wherein the finger slot sliders are movably arranged on the slide rails and configured to receive pressing, and the joystick is configured to control the care robot;

the gesture parsing unit is configured to parse three-dimensional gestures of the controller body, and control the care robot to perform corresponding actions when the three-dimensional gestures of the controller body are in line with preset gestures; and the tactile sensing unit is configured to sense the pressing received by the finger slot sliders and initiate a user mode corresponding to pressing information, so that the controller body provides corresponding vibration feedback, wherein the controller body comprises filling sliders and four slide rails arranged around the controller body, wherein each slide rail corresponds to a finger slot slider and at least one filling slider, and the finger slot slider and the filling slider form a circular ring and are movably arranged on the slide rail, wherein the controller body further comprises a first button and a second button, and the tactile sensing unit activates the controller body and controls the first button and the second button to provide vibration feedback when the first button and the second button receive pressing at the same time, wherein the tactile sensing unit is configured to control the four finger slot sliders on the four slide rails to provide vibration feedback after the controller body is activated, and then sense the pressing received by the finger slot sliders, and if a pressing mode corresponds to a stored user mode, initiate a corresponding user mode and invoke a corresponding sensing feedback model to sense pressure and control the vibration feedback; if the pressing mode doesn't correspond to any stored user mode, record the pressing mode and create a new corresponding user mode, control the finger slot sliders to provide vibration feedback, record pressure values sensed by the finger slot sliders and the current corresponding vibration feedback intensity, and thereby train an initial sensing feedback model, wherein the tactile sensing unit is preset with pressing rules corresponding to operating modes, and if an operating mode corresponding to a sensed pressing rule exists after the first button receives pressing in the user mode, triggers the care robot controller to enter into the corresponding operating mode, wherein the operating mode comprises a care robot movement control mode, in which the joystick is activated after it is swung in a circumferential direction, the controller body is activated after it is turned in the circumferential direction, and the gesture parsing unit parses an inclination angle θ of the controller body, and if the inclination angle θ meets a criterion "preset threshold α<θ<preset threshold β", calculates a movement direction and speed corresponding to the inclination angle θ, and thereby controls a movement of the care robot.

2. The care robot controller according to claim 1, wherein the operating mode comprises a care robot arm control mode, in which the joystick is activated after it is swung in the circumferential direction, the controller body is activated after it is turned in the circumferential direction, and the gesture parsing unit parses an inclination angle θ of the controller body, and if the inclination angle θ meets a criterion "preset threshold α<θ<preset threshold β", controls the ends of the care robot arms to move up or down according to the inclination angle θ if an orientation of the controller body is within a range of a preset first sector; or controls the ends of the care robot arms to rotate in a forward or backward direction in a horizontal plane according to the inclination angle θ if the orientation of the controller body is within a range of a preset second sector.

3. The care robot controller according to claim 2, wherein the operating mode comprises a care robot jaw control mode, the care robot controller enters into the care robot jaw control mode when the second button is pressed in the care robot arm control mode of the care robot controller, and in the care robot jaw control mode, the gesture parsing unit parses an inclination angle θ of the controller body, and if the inclination angle θ meets a criterion "preset threshold α<θ<preset threshold β", controls the jaws of the care robot arms to grip or release according to the inclination angle θ if the orientation of the controller body is within the range of the preset first sector; or controls the ends of the care robot arms to rotate in a forward or backward direction in a vertical plane according to the inclination angle θ if the orientation of the controller body is within the range of the preset second sector.

4. The care robot controller according to claim 3, wherein the first button and the second button provide vibration feedback after they receive a pressing command, and the tactile sensing unit invokes the sensing feedback model to control the finger slot sliders to provide vibration feedback after the finger slot slider receive pressing as a command input.

5. The care robot controller according to claim 4, wherein the sensing feedback model is configured to learn ranges of pressure on the finger slot sliders and combinations of the pressure values in a specific user mode, and adjust pressing thresholds for the vibration feedback of the finger slot sliders according to the ranges of pressure and the combinations of the pressure values.

* * * * *